United States Patent [19]
Humphries et al.

[11] Patent Number: 5,189,406
[45] Date of Patent: Feb. 23, 1993

[54] DISPLAY DEVICE

[75] Inventors: Brian J. Humphries, Windsor; Colin M. Waters, Frodsham; Steven D. Bull, Ripley; Christopher J. Morris, Feltham, all of England

[73] Assignee: Thorn EMI plc, London, England

[21] Appl. No.: 754,186

[22] Filed: Aug. 28, 1991

Related U.S. Application Data

[63] Continuation of Ser. No. 642,145, Jan. 15, 1991, which is a continuation of Ser. No. 175,405, Mar. 30, 1988, which is a continuation-in-part of Ser. No. 99,458, Sep. 21, 1987, abandoned.

[30] Foreign Application Priority Data

Sep. 20, 1986 [GB] United Kingdom ............... 8622717
Sep. 18, 1987 [EP] European Pat. Off. ....... 87308314.1
Dec. 4, 1987 [GB] United Kingdom ............... 8728434

[51] Int. Cl.$^5$ .............................................. G09G 3/00
[52] U.S. Cl. .................................... 340/793; 340/767; 340/784
[58] Field of Search ............... 340/719, 767, 793, 784, 340/805; 315/169.1, 169.2, 169.3, 169.4; 358/236, 241; 359/54

[56] References Cited

U.S. PATENT DOCUMENTS

| | | | |
|---|---|---|---|
| 4,201,983 | 5/1980 | Magerl et al. | 340/724 |
| 4,427,979 | 1/1984 | Clerc et al. | 340/793 |
| 4,508,429 | 4/1985 | Nagae et al. | 340/784 |
| 4,559,535 | 12/1985 | Watkins et al. | 340/793 |
| 4,702,560 | 10/1987 | Ends et al. | 340/794 |
| 4,709,995 | 12/1987 | Kuribayashi et al. | 340/793 |
| 4,752,774 | 6/1988 | Clerc et al. | 340/793 |
| 4,779,083 | 10/1988 | Ishii et al. | 340/793 |
| 4,804,951 | 2/1989 | Yamashita et al. | 340/784 |
| 4,804,956 | 2/1989 | Yamashita et al. | 340/784 |
| 4,979,083 | 10/1988 | Ishii et al. | 340/793 |

FOREIGN PATENT DOCUMENTS

| | | |
|---|---|---|
| 0151508 | 8/1985 | European Pat. Off. |
| 1594151 | 7/1981 | United Kingdom |
| 2079509 | 1/1982 | United Kingdom |

Primary Examiner—Ulysses Weldon
Assistant Examiner—M. Fatahiyan
Attorney, Agent, or Firm—Keck, Mahin & Cate

[57] ABSTRACT

The display has a video signal receiver and a store with a capacity to hold one picture of the video signal. Row-output devices enable the video information for respective rows of pixels to be taken out from picture store, and each has a bit extractor to separate out one bit of the information for each pixel of the respective row. The resultant signal is passed to pixel drivers which operates on a lattice formed of ferroelectric liquid crystal pixel-elements, which are time-multiplex addressed according to a predetermined sequence, each row being addressed a plurality of times for each picture. In the addressing groups of the rows are set simultaneously, each group consisting of a plurality of rows spaced apart in the addressing sequence such that the rows in a group form a series with adjacent rows having a temporal separation in the addressing sequence exhibiting a geometric progression with the common ratio N being an integer corresponding to 2 or more.

26 Claims, 11 Drawing Sheets

| LINE | T0 | T40 | T80 | T120 | T160 | T200 |
|------|----|----|----|----|----|----|
| 1 | | 1 | 2 | | | |
| 41 | | | 1 | 2 | | |
| 81 | | | | 1 | 2 | |
| 121 | | | | | 1 | 2 |
| 161 | | | | | | |
| 201 | | | | | | |
| 241 | | | | | | |
| 281 | 4 | | | | | |
| 321 | | 4 | | | | |
| 361 | | | 4 | | | |
| 401 | | | | 4 | | |
| 441 | 3 | | | | 4 | |
| 481 | | 3 | | | | 4 |
| 521 | 2 | | 3 | | | |
| 561 | 1 | 2 | | 3 | | |
| 600 | | | | | | |

| | BIT SIGNIFICANCE | | | | |
|---|---|---|---|---|---|
| | 1 | 2 | 3 | 4 | 5 |
| 0 | 0 | 0 | 0 | 0 | 0 |
| 1 | 1 | 0 | 0 | 0 | 0 |
| 2 | 0 | 1 | 0 | 0 | 0 |
| 3 | 1 | 1 | 0 | 0 | 0 |
| 4 | 0 | 0 | 1 | 0 | 0 |
| 5 | 1 | 0 | 1 | 0 | 0 |
| 6 | 0 | 1 | 1 | 0 | 0 |
| 7 | 1 | 1 | 1 | 0 | 0 |
| 8 | 1 | 0 | 0 | 1 | 0 |
| 9 | 0 | 1 | 0 | 1 | 0 |
| 10 | 1 | 1 | 0 | 1 | 0 |
| 11 | 0 | 0 | 1 | 1 | 0 |
| 12 | 1 | 0 | 1 | 1 | 0 |
| 13 | 0 | 1 | 1 | 1 | 0 |
| 14 | 1 | 1 | 1 | 1 | 0 |
| 15 | – | – | – | – | – |
| 16 | 0 | 0 | 0 | 0 | 1 |
| 17 | 1 | 0 | 0 | 0 | 1 |
| 18 | 0 | 1 | 0 | 0 | 1 |
| 19 | 1 | 1 | 0 | 0 | 1 |
| 20 | 0 | 0 | 1 | 0 | 1 |
| 21 | 1 | 0 | 1 | 0 | 1 |
| 22 | 0 | 1 | 1 | 0 | 1 |
| 23 | 1 | 1 | 1 | 0 | 1 |
| 24 | 1 | 0 | 0 | 1 | 1 |
| 25 | 0 | 1 | 0 | 1 | 1 |
| 26 | 1 | 1 | 0 | 1 | 1 |
| 27 | 0 | 0 | 1 | 1 | 1 |
| 28 | 1 | 0 | 1 | 1 | 1 |
| 29 | 0 | 1 | 1 | 1 | 1 |
| 30 | 1 | 1 | 1 | 1 | 1 |
| 31 | – | – | – | – | – |

DISPLAY DEVICE

This application is a continuation of application Ser. No. 07/642,145, filed Jan. 15, 1991, which is a continuation of application Ser. No. 07/175,405, filed Mar. 30, 1988, which is a continuation-in-part of application Ser. No. 07/099,458, filed Sep. 21, 1987 now abandoned.

The present invention relates to a display device, and especially, but not solely, to grey-scale television display using bi-stable elements, for example made from ferroelectric liquid-crystal material.

British Patent Specification No. 1594151 discloses a display in which each element is driven for a period proportional to the value of the binary video signal.

The present invention provides a display device comprising:

a lattice of pixel elements, each selectably settable in dependence on the respective part of a received signal representing one picture for display;

means to effect time-multiplex addressing of rows of pixel elements according to a predetermined sequence, each row being addressed a plurality of times for each picture;

the addressing means including means to set simultaneously groups of the rows, each group consisting of a plurality of rows spaced apart in the addressing sequence such that the rows in a group form a series with adjacent rows having a temporal separation in the addressing sequence exhibiting a geometric progression with the common ratio N being an integer corresponding to 2 or more.

Preferably, N corresponds to the number of states in the pixel. Accordingly, by equating the orders of group time-multiplexing and of spatial-dither, maximal efficient and effective operation of both techniques can be achieved for a given number of grey levels required.

Preferably, a signal for a picture includes a plurality of portions each representing the data for setting a pixel element in the lattice, each such portion being constituted by a plurality of sections, a section representing the addressing-data for the pixel element in respect of one address in that picture.

Preferably, the addressing means includes: means to set all the pixels of one row of a group in accordance with a section of the pixel data in one picture and, sequentially in a line period, to set all the pixels of another row of the group in accordance with another section of the pixel data in that picture. Advantageously, each group of rows is formed of collections of rows each of which, during one setting operation, is set in accordance with a section of pixel data different from the others in the group, the number of rows in a collection being the number of rows in the display divided by $$\frac{(N^M - 1)}{(N - 1)}.$$

After being addressed, the pixel elements remain, or are maintained, set until the next addressing occurs. Thus the time duration of each pixel being set depends on the temporal separation in the addressing sequence between the relevant pixels, this separation having a geometric progression relationship in a group as hereinbefore indicated. Thus the addressing means operates to set a row for a first predetermined time interval in one address for a given picture, and then to set the row for a second predetermined time interval in another address for that picture, thereby providing differing setting times for different addresses of a row for a given picture.

Preferably the display device comprises means to produce a value for the mean brightness level for a picture, and means to effect scaling of the sections of pixel-data for each group in the next picture in accordance with the produced mean brightness value for the said previous picture.

In one particular form, the present invention provides a display device comprising:

a lattice of pixel elements, each selectably settable in dependence on the respective part of a received signal representing one picture for display;

means to effect time-multiplex addressing of rows of pixel elements according to a predetermined sequence, each row being addressed a plurality of times for each picture;

the addressing means including means to set simultaneously groups of the rows, each group consisting of a plurality of rows spaced apart in the addressing sequence such that the rows in a group form a series with adjacent rows having a temporal separation in the addressing sequence exhibiting a geometric progression with the common ratio N being an integer corresponding to 3 or more.

The present invention also provides a method of operating a display device having a lattice of pixel elements each selectably settable, the method comprising:

receiving a signal representing a plurality of pictures for display;

time-multiplex addressing rows of pixel elements a plurality of times for each picture;

the addressing step including setting simultaneously groups of the rows, each group consisting of a plurality of rows spaced apart in the addressing sequence such that the rows in a group form a series with adjacent rows having a temporal separation in the addressing sequence exhibiting a geometric progression with the common ratio N being an integer corresponding to 2 or more.

Preferably, N corresponds to the number of states in the pixel.

Preferably, the addressing step includes: setting all the pixels of one row of a group in accordance with a section of the pixel data in one picture and, sequentially in a line period, setting all the pixels of another row of the group in accordance with another section of the pixel data in that picture. Advantageously, each group of rows is formed of collections of rows each of which, during one setting operation, is set in accordance with a section of pixel data different from the others in the group, the number of rows in a collection being the number of rows in the display divided by $$\frac{(N^M - 1)}{(N - 1)}.$$

Preferably, the method includes producing a value for the mean brightness level for a picture, and effecting scaling of the sections of pixel-data for each group in the next picture in accordance with the produced mean brightness value for the said previous picture.

The present invention enables the effective addressing of a lattice of bi-stable settable pixel elements without requiring additional lines and drivers, or high resolution spatial dither techniques or extremely fast switching times.

Preferably, a pixel comprises one or more liquid crystal cells.

In one form, the present invention provides a method of operating a display device having a lattice of pixel elements each selectably settable, the method comprising:

receiving a signal representing a plurality of pictures for display;

time-multiplex addressing rows of pixel elements a plurality of times for each picture;

the addressing step including setting simultaneously groups of the rows, each group consisting of a plurality of rows spaced apart in the addressing sequence such that the rows in a group form a series with adjacent rows having a temporal separation in the addressing sequence exhibiting a geometric progression with the common ratio N being an integer corresponding to 3 or more.

The present invention is applicable to colour displays and to monochrome displays.

Another aspect of the present invention provides equipment suited and/or designed for the generation of signals of a format for a display device embodying the present invention, for example of a format as described and shown herein. Further aspects of the present invention provide equipment suited and/or designed for the transmission of such signals, equipment suited and/or designed for the reception of such signals, and equipment for the processing of such signals. Thus, for example, the present invention embodies a driver integrated circuit which is suited and/or designed for the addressing of a display device in the manner herein described.

As indicated elsewhere in this patent specification, N can have any integral value above, and including, 2; particularly advantageous values include 2, 4, 8 and 16 as these provide particularly effective and efficient operation with spatial-dither techniques having the orders of ( i.e. the number of separately-settable areas per pixel) 1, 2, 3 and 4 respectively.

In order that the invention may more readily be understood, a description is now given, by way of example only, reference being made to the accompanying drawings, in which.

Figure 1:
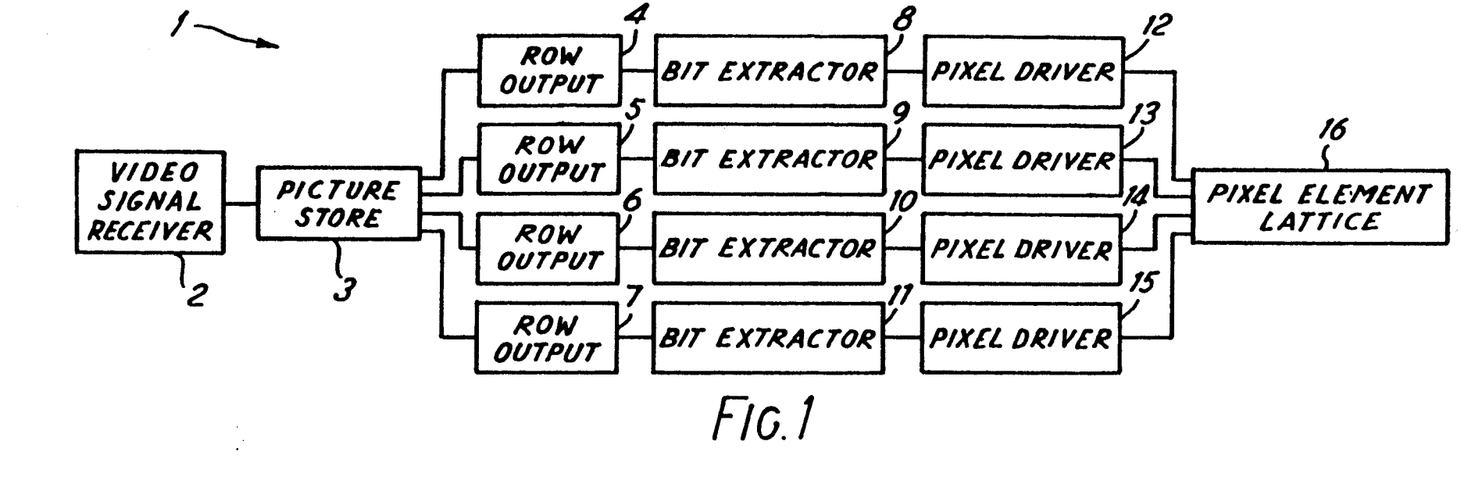
FIG. 1 is a block circuit diagram of a display device embodying the present invention.

In FIG. 1, the display device, generally designated as 1, has a video signal receiver 2 and a store 3 with a capacity to hold an adequate amount of the video signal to enable the display of a complete image, i.e. one picture of the video signal. There are also four row-output devices 4,5,6 and 7, each of which enable the video information for a row of pixels to be taken out from picture store 3; each such device has a bit extractor 8,9,10 or 11 respectively to separate out one bit of the information for each pixel of the respective row, the resultant signal being passed to a pixel driver 12,13,14 or 15 which operates on a lattice 16 formed of 600 rows each of 50 bi-stable surface stablished ferroelectric liquid crystal pixel-elements.

Figure 2:
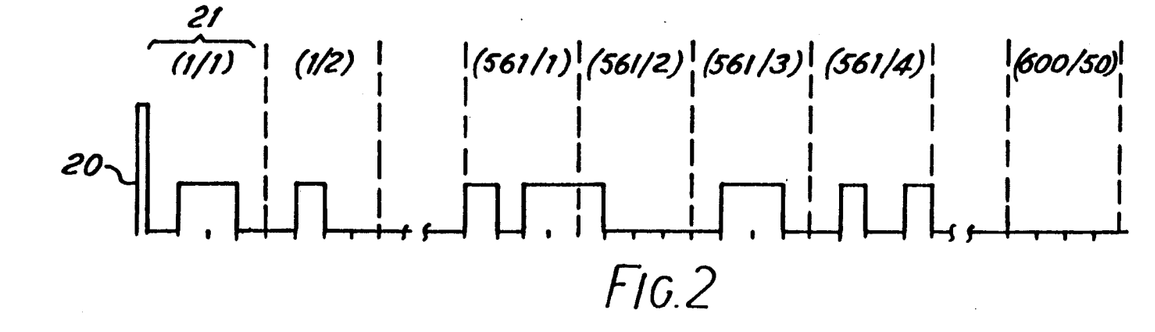
FIG. 2 is a representation of part of a digital video signal for use with the display device shown in FIG. 1.

FIG. 2 shows an abbreviated form of a video signal suitable for use with the display device 1 and corresponding to one picture in length. This signal has a flag pulse 20 to indicate the start of the signal for a picture, and then a number of portions (only one being referenced, as 21), each being the display data for a particular pixel (as indicated by the bracketed co-ordinates in FIG. 2, whereby X/Y refers to the pixel of row X, column Y). More specifically, each portion 21 has four bits each of which represents the setting value for use in one of the addressing stages as described hereinafter in relation to FIGS. 3 and 4.

Figure 3:
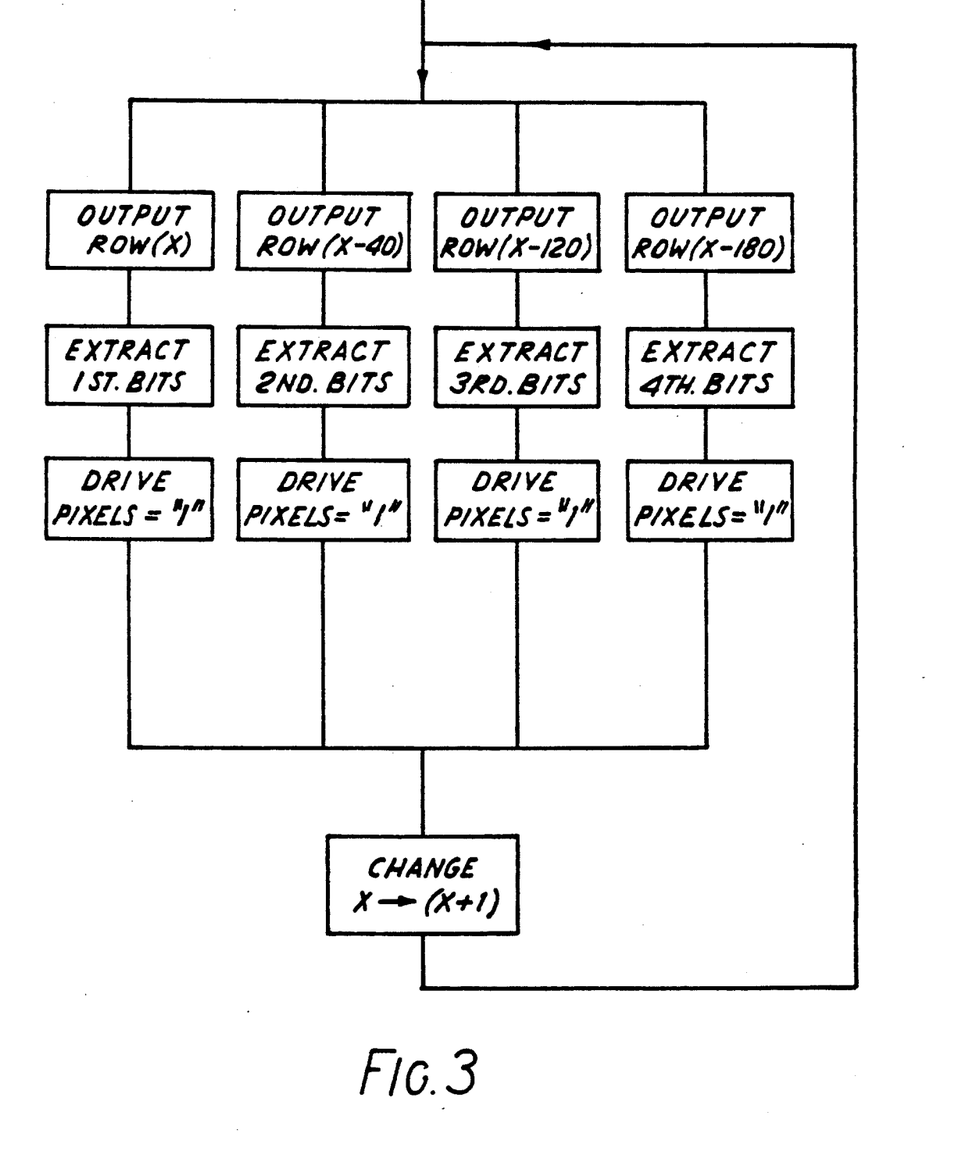
FIG. 3 is a block flow diagram of part of the operation of the device shown in FIG. 1.
Figure 4:
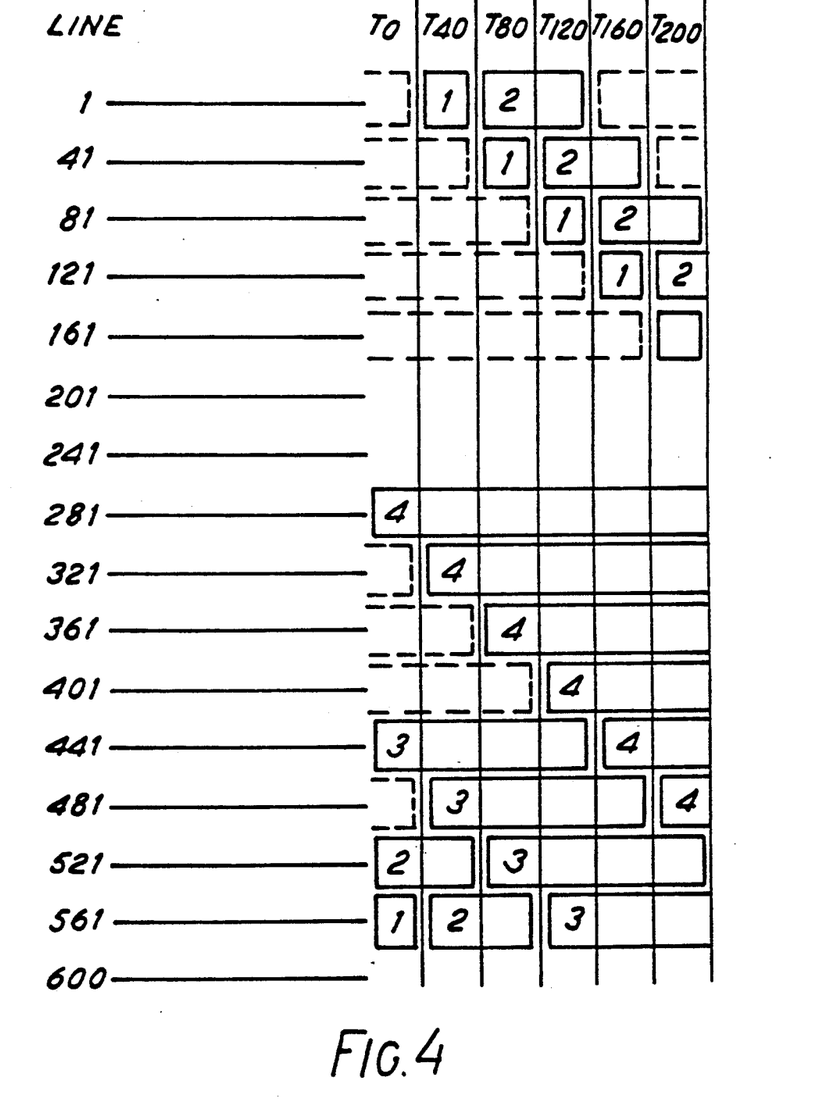
FIG. 4 is a representation of the addressing sequence of the device shown in FIG. 1.

FIG. 3 shows the sequence of operations of the row-outputs, bit extractors and pixel drivers during a line period, while FIG. 4 shows the mode of addressing performed on certain of the rows over a picture period.

FIG. 4 shows the display device 1 at the stage at which rows 281, 441, 521 and 561 are being addressed in a given line period. Thus each pixel element in row 561 of the lattice which has a "1" as its first bit (i.e. least significant bit) is turned on, while all the other pixel elements are turned off; accordingly, taking the video signal shown in FIG. 2, pixels 561/1 and 561/2 would be on and pixels 561/3 and 561/4 would be off. Similarly each pixel element in row 521 which has a "1" as its second bit is turned on, each pixel element of line 441 which has a "1" as its third bit is turned on, and each pixel element of line 281 which has a "1" as its fourth bit (i.e. most significant bit) is turned on. All these pixels are addressed sequentially within one line period.

In the next line period, lines 282, 442, 522 and 562 are addressed in exactly the same way as were lines 281, 441, 521 and 561 respectively in the previous line period. Likewise for the next and subsequent line periods. However, in the 41st line period the addressed lines are 321, 481, 561 and 1 (the latter being effectively line 601). Therefore line 561 which was addressed by the first bit of the display data in the first line period is addressed by the second bit of the display data; the interval between the two addresses is 40 line periods, so that the first bit display data drives the relevant pixels for a time interval which is 1/16 of a picture period and which corresponds to one grey level. The third addressing of line 561, by the third bit of the display data, occurs after a further 80 line periods, so the second bit display data is used for a further 2/16 of a picture period and therefore corresponds to two grey levels; the next addressing is by the fourth bit after another 160 line periods and so the third bit display data is used for this time interval which corresponds to four grey levels; the next addressing is by the first bit after another 320 line periods which corresponds to eight grey levels. The human visual system has a response which integrates these individual grey levels.

In the same way, each line in the picture is addressed four times during a picture period, at intervals of 40, 80, 160 and 320 line periods, and each pixel element can be turned on for any one or more of these intervals as considered appropriate. Thus a display data portion of four bits defines one of 16 grey levels. Taking the display data portions shown in FIG. 2, 1/1 has level 6 of 16 grey levels, 1/2 has level 2, 561/1 has level 13, 561/2 has level 1, 561/3 has level 6, 561/4 has level 10 and 600/50 has level 0.

Figure 5:
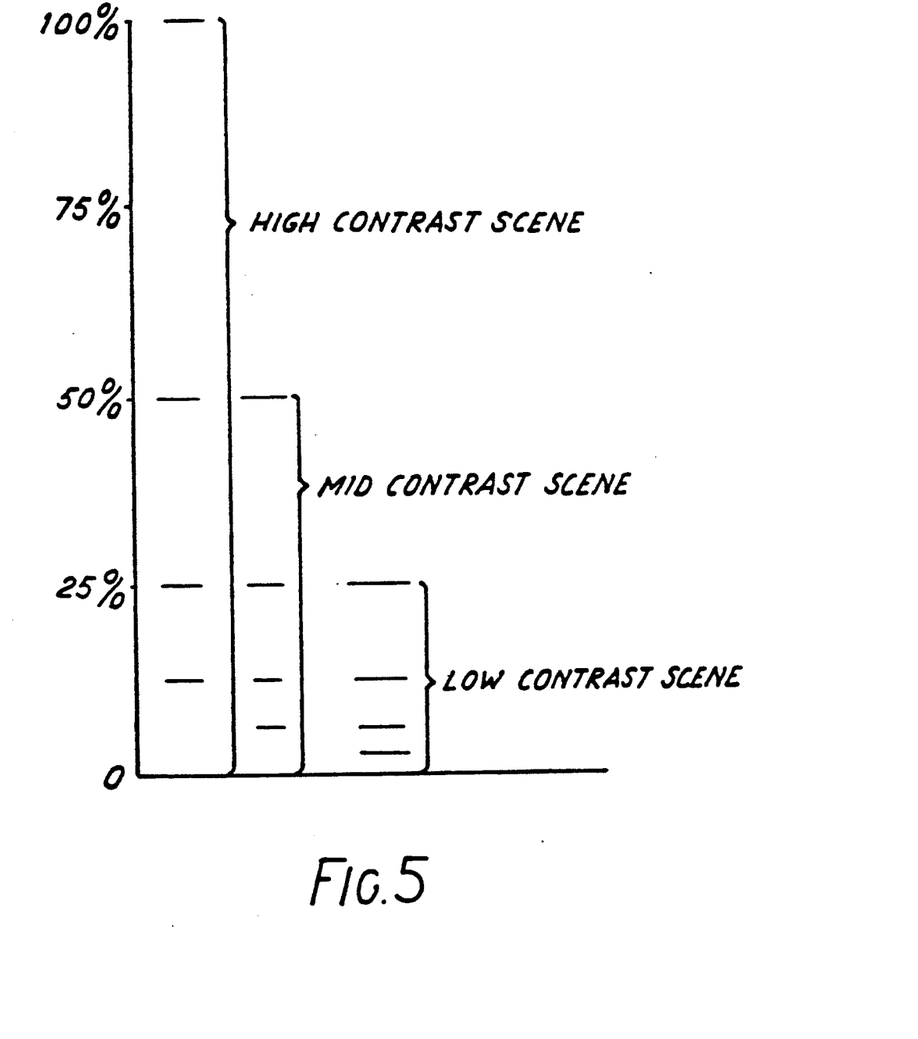
FIG. 5 is a representation of a processing stage in another display device embodying the present invention.
Figure 6:
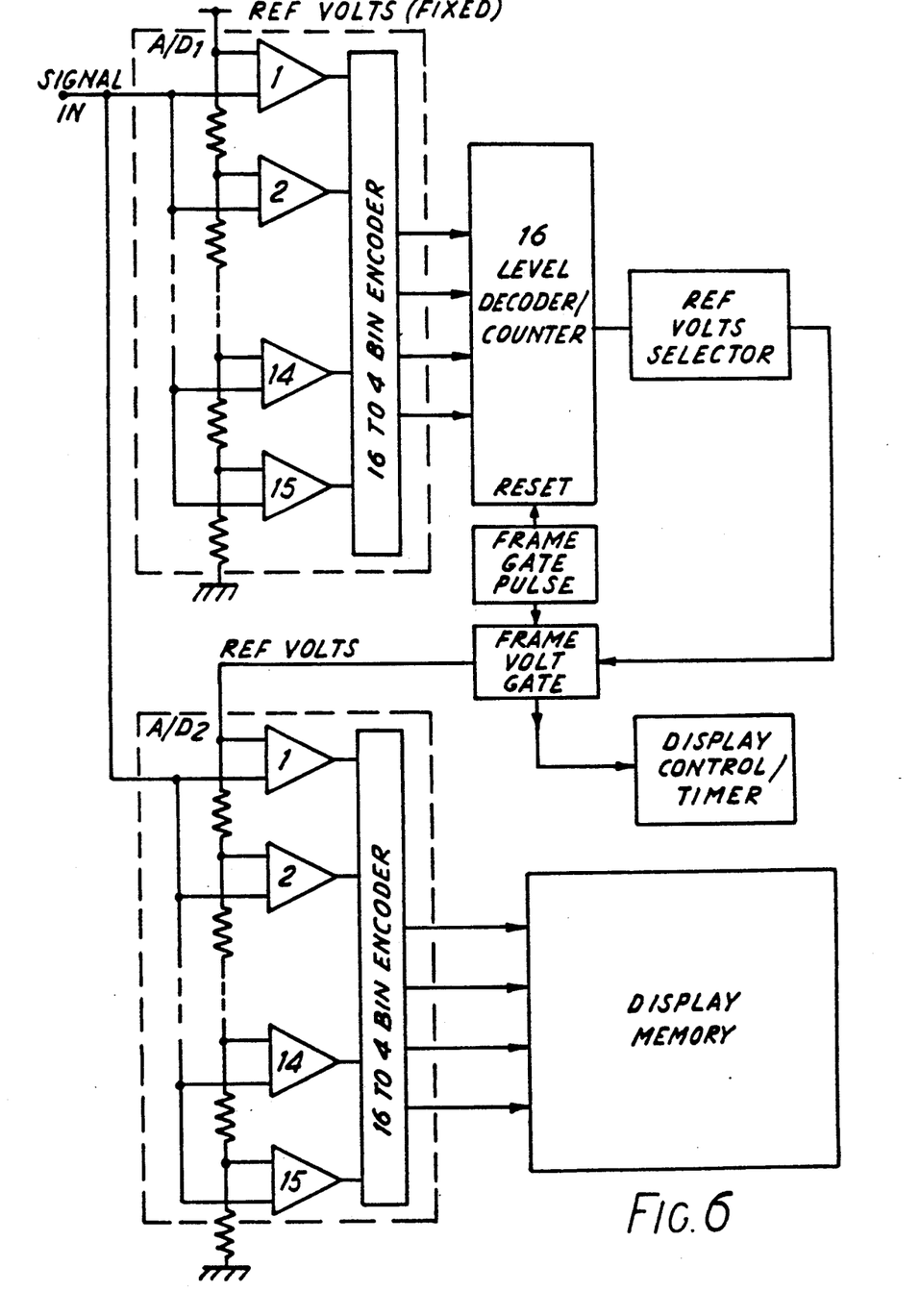
FIG. 6 is a block circuit diagram of part of a display device in accordance with that of FIG. 5.

In any one picture it may only be possible to differentiate 16 grey levels; however this may not be adequate to display the full dynamic range of brightness levels in successive pictures, since very bright or very dark pictures will lose contrast and fade out. As an alternative to reducing the line address time to 20 µs to display 255 lines/field with a full 8 fit resolution, there may be used an adaptive greyscale scheme in which the mean brightness level of the preceding field sets the reference voltage of a 4-bit A/D converter. The analogue signal is converted by the A/D converter so that the 4-bits scale the range of brightness in the previous picture ensuring that 16 grey levels can always be resolved in each picture; FIG. 5 shows the quantisation of 4-bit levels for scenes of various contrast levels. This is achieved by detecting some defined mean brightness level of the previous frame; the level is compared with the 100% brightness level in a step comparator which then provides a variable reference voltage to scale the brightness levels. FIG. 6 is a block circuit diagram of equipment which can achieve the adaptive scaling.

To vary the brightness level on the display in accordance with the adaptive scaling, the rows in a group are scaled over a fraction of the address line. Address lines outside the group are blanked by a blanking pulse applied in the form of an additional bit of information at the end of the period displaying the most significant bit. This decreases the line write time available from 67 µs to 53 µs. The number of rows in the group are compressed until the period for the least significant bit is only one line address time. If each field is addressed in two halves in parallel a group could scale a maximum of 150 lines (100% Brightness) or a minimum of 15 lines (10% Brightness) with a total of 10 brightness levels obtainable in all. Some or all of these brightness levels are used to define the variable reference voltages supplied to the A/D converter ensuring that the brightness level in each scene is faithfully reproduced. To reduce contouring effects the reference voltage signal may in fact be dithered in a random fashion by an amount equivalent to the least significant bit to realize 5-bit resolution. This adaptive feature essentially provides an automatic contract and brightness adjustment so that at least sixteen grey levels can always be resolved in any scene irrespective of brightness.

Figure 7:
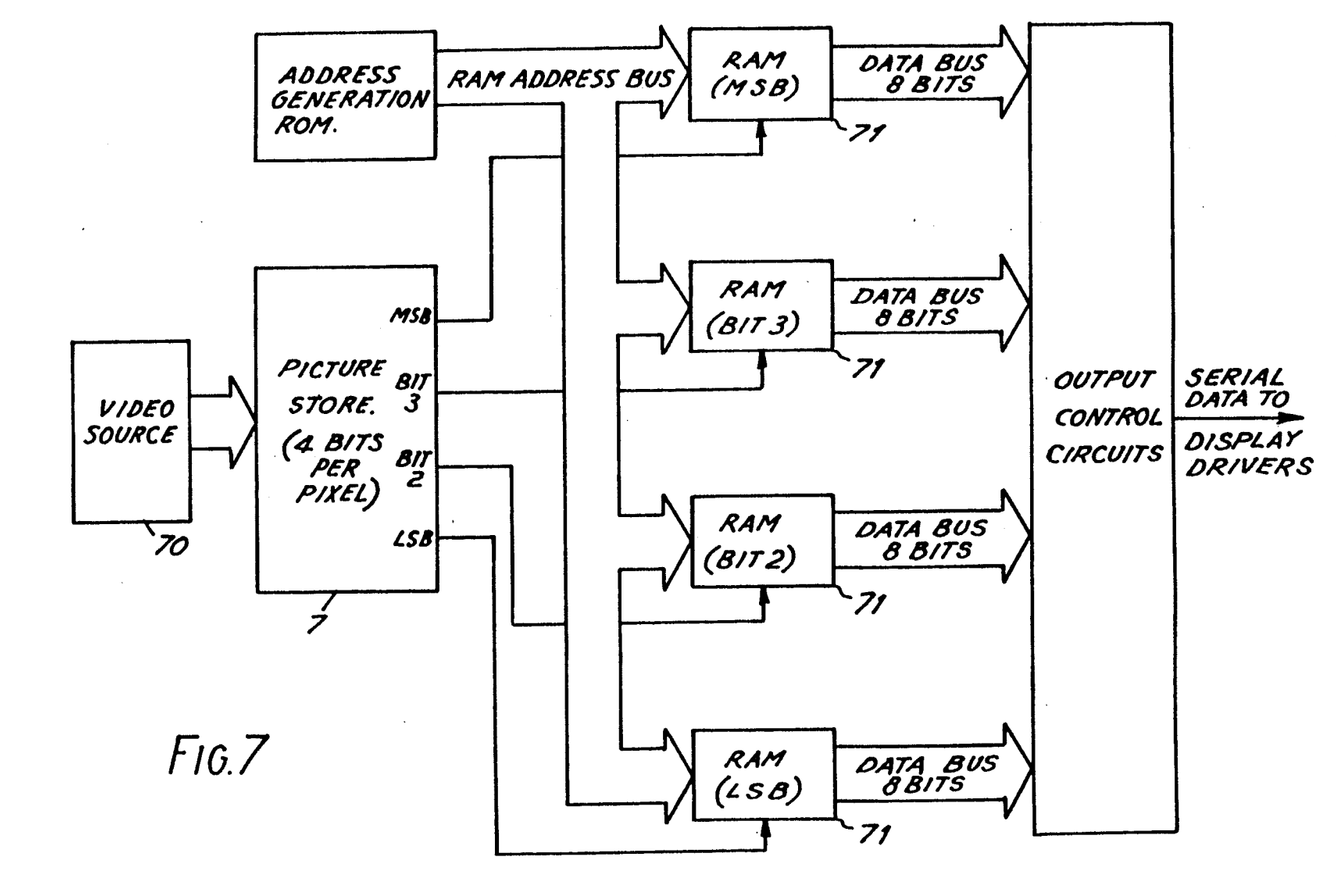
FIGS. 7 to 11 relate to another form of the invention.
Figure 10:
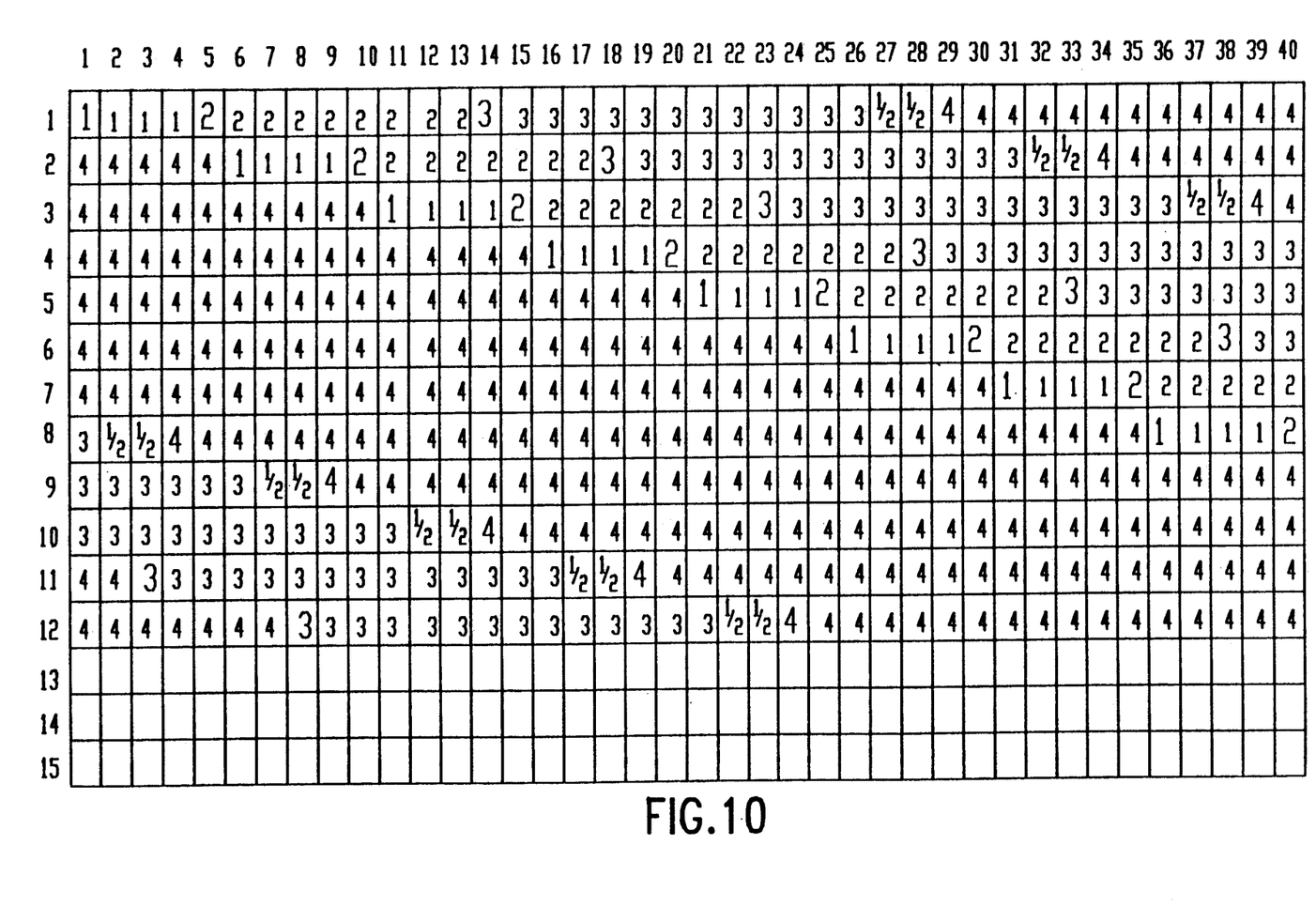
Figure 11:
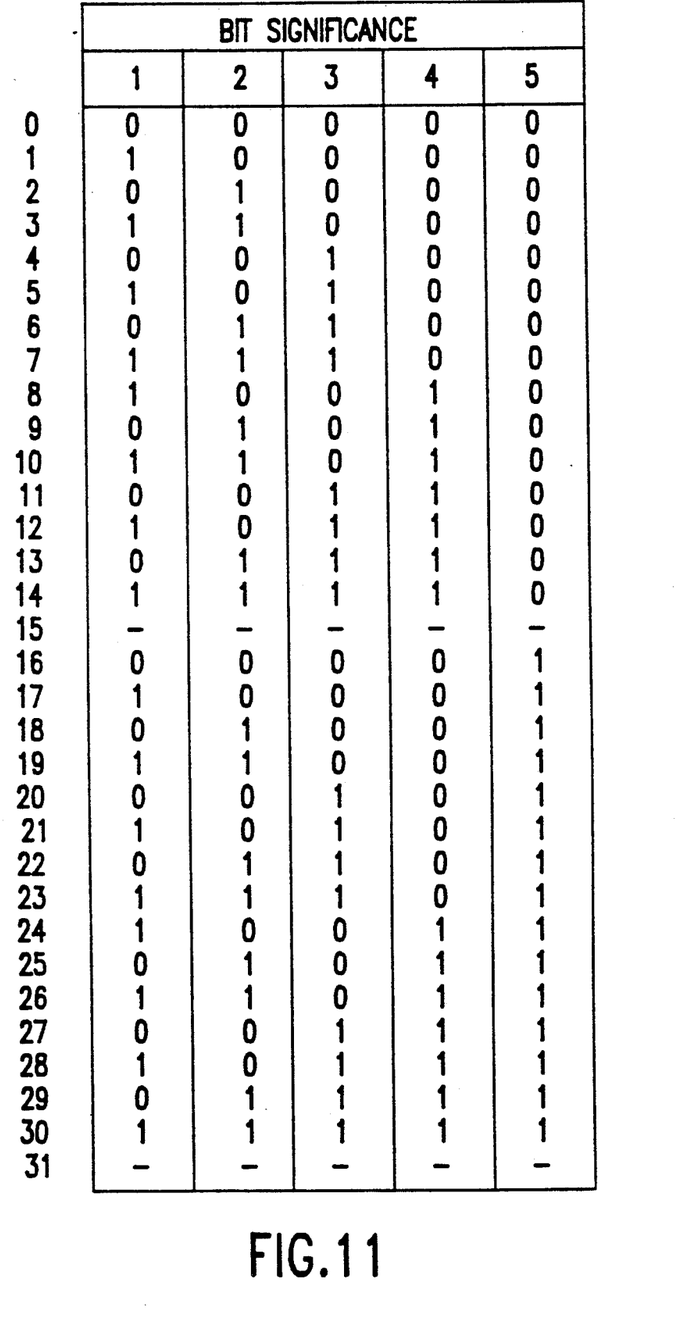

A display device which operates in accordance with the technique illustrated by FIGS. 7, 10 and 11 differs from that previously described in that firstly, data is accessed from the picture store 70, each significant bit then being stored in one of four RAMs 71 depending on the significance of each bit, in bytes of 8 bits. Secondly, data is retrieved in blocks of bytes in a fashion suitable to write a bit of a particular significance to a group of x lines of the display in one operation. The original scheme proposed only access to one line of data with each operation so the number of operations is now reduced by a factor x.

In the previously described arrangement it was proposed that the number of lines, m, scanned could be $m = 2^n - 1 \times p$ where n is the number of bits and p is an integer. However, when the bits are written in a simple sequence of increasing significance as shown in FIG. 8, an error arises when the time to write each line is significant compared to the time of the least significant bit.

Figure 8:
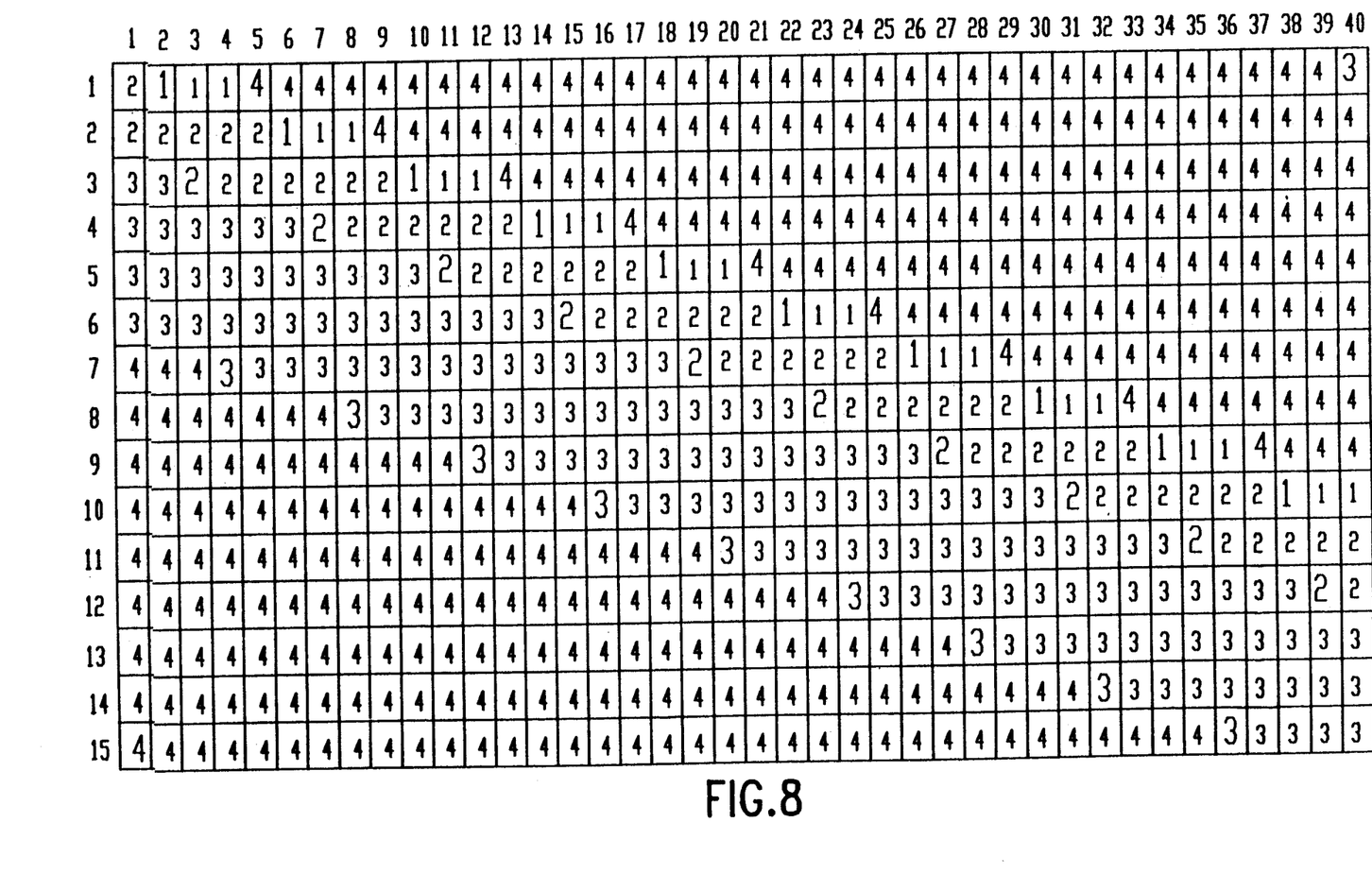

Therefore, as shown in FIG. 8, when the minimum number of lines are scanned (15 lines for a 4 bit scheme) the line writing time error distorts the time division of the 4 bits to give a ratio 0.75:1.75:3.75:8.75.

Figure 9:
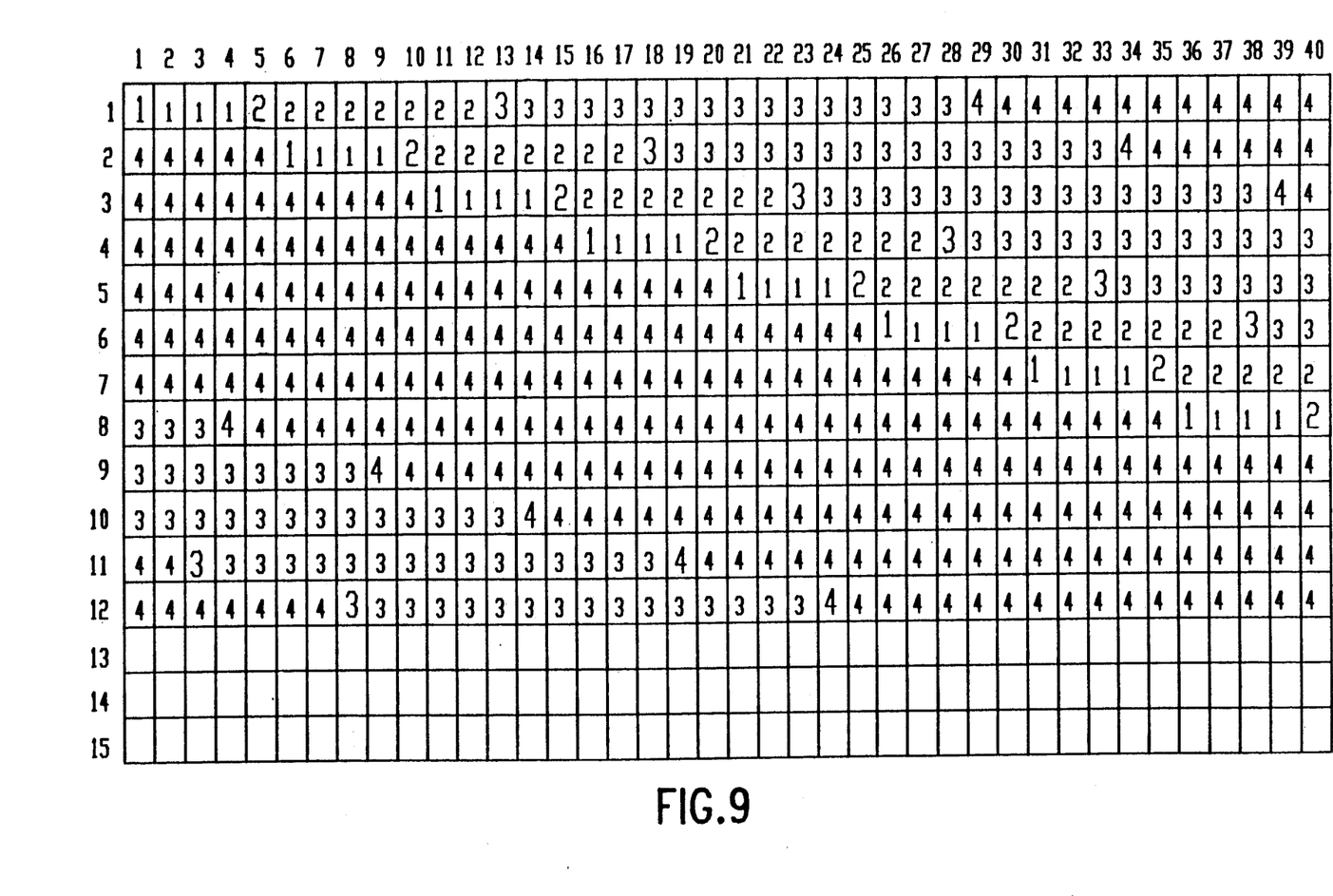

The data handling process described above may generate significant errors in half-tone levels if the addressing sequence of FIGS. 1 to 6 was employed. However, the addressing sequence can be modified to remove this error as shown in FIG. 9; the addressing sequence is changed to address each bit according to its significance in the order 1,-,3,4,2 where - represents a line period where no line is addressed (blank line period). There are three consequences of this addressing sequence, namely the binary time division is error free in the ratio 1:2:4:8; the number of lines scanned now becomes 12, or a multiple of this number; the time available to write each line is reduced by 20%.

The decrease in efficiency of line write time can be restored by extending the scheme and utilising the blank line period to switch the last ½ bit of the 3rd significant bit as shown in FIG. 10. This can be used in two ways: to provide a means of implementing a ½ bit error diffusion algorithm; to provide a reduced 5 bit scheme.

In this case the ½ bit becomes the least significant bit (m=1) and must be subtracted from the 4th significant bit; the standard binary logic table must therefore be modified accordingly as shown in the table of FIG. 11. From that table, it can be seen that of 32 half-tone levels in the reduced 5 bit scheme, only level 15 and 31 will not be accessible.

The scheme is suitable for use with a two state optical device as a Surface Stabilised Ferroelectric Liquid Crystal Device (SSFLCD). However certain 'two field' addressing schemes are sometimes necessary to drive a SSFLCD, where the 'on' and 'off' data are written in sequential fields which would not be compatible with the addressing sequence of FIGS. 1 to 6. However, using the modified sequence of FIGS. 7, 10 and 11 the group of lines addressed with the same bit significance (where the number of lines in group=total number of lines−12) can be considered to constitute a 'minifield'. This 'minifield' can then be scanned first with the 'on' strobe and data, and immediately afterwards with the 'off' strobe and data with the introduction of only a very small error ($\leq \frac{1}{4}$ bit) to the half-tone level.

In the addressing sequence of FIGS. 7, 10 and 11, the "1" bit is written in N/15 consecutive rows, then the "2" bit in N/15 consecutive rows and so on, i.e. all the rows of the "1" Binary Addressed Group (BAG) followed by ½ the rows of the "2" BAG, ¼ the rows of the "3" BAG and ⅛ the rows of the "4" BAG. The picture store can therefore be addressed in blocks of N/15 rows instead of single rows, since the rows of the block are always consecutive, so reducing the number of address operations by a factor of N/15.

However, this modified sequence may produce errors in the display period of each digit and consequently in the grey scale. For example, in a 60 line display the number of rows in a block would be 4 and the bits would be written in the rows as follows: (4) 57, 58, 59, 60, (1) 1, 2, 3, 4, (2) 9, 10, 11, 12 (3) 25, 26, 27, 28 (4) 1, 2, 3, 4 (1) 5, 6, 7, 8 (2) 13, 14, 15, 16 (3) 29, 30, 31, 32 (4) 5, 6, 7, 8 etc. It can be seen that the "1" bit is displayed in rows 1, 2, 3, 4 for 3 line periods (assuming 4 rows are written per line period) before being re-written by the "4" bit whereas the display ought to be 4 line periods. Similarly the "2" bit is displayed for 7 instead of 8 line periods, the "3" bit for 15 instead of 16 and the "4" bit for 35 instead of 32. To overcome this, a further modification to the write sequence is proposed (in FIG. 9). Instead of writing the bits in the order 1, 2, 3, 4 they are written in the order 1, 0, 3, 4, 2 where 0 indicates that no row is written. Alternatively, a "½" bit can be written, during the "0" period, in the same row as the "4" bit. The "½" bit is in effect the L.S.B. of a 5 bit binary number and increases the number of grey levels from 16 to 30.

In another variant, the display consists of n lines of separately-addressable SSFLCD light gates; a typical value for n for use in television might be 575. Each line contains about 1.7 n light-gates for a television picture having an aspect ratio of 9:16. Each light-gate (pixel) is divided into at least two subpixels having open areas a, b which could be in the ratio about 1:2.5.

By suitable logic circuits in the binary coded video input, if p=q=2, these subpixels are addressed as a, b or a+b, to giving light outputs in the ratio 1:2.5:3.5. Further logic circuits are simultaneously used to implement a 2-bit BAG scheme, so giving a similar set of exposure times in the ratio 1:2:3. Thus, by combining simply in pairs, the available halftones are as shown in Table I.

TABLE I

Halftones with 2-bit + 2-bit, Simple Processing (blacklevel = 1; ratio of times 2:1)

| Subpixel | Time | Total |
|---|---|---|
| 0 | 0 | 1 |
| 1 | 1 | 2 |
| 1 | 2 | 3 |
| 1 | 3 | 4 |
| 2.5 | 1 | 3.5 |
| 2.5 | 2 | 6 |
| 2.5 | 3 | 8.5 |
| 3.5 | 1 | 4.5 |
| 3.5 | 2 | 8 |
| 3.5 | 3 | 11.5 |

The spacing between the various available levels with this scheme must be compared with the minimum discernable contrast difference under average viewing conditions of 3 dB. This shows that 2-bit spatial and 2-bit temporal division should be adequate for halftoning until the maximum contrast ratio as set by the panel construction (e.g. alignment) are improved or until the contract ratio is better than about 24 dB (16:1).

If the spatially divided subpixel is combined with a particular bit in the temporal group, further halftones can be obtained up to a maximum of m=p+q bits. Thus 15 levels can be obtained in this way from a 2-bit subdivided pixel and a 2-bit time division. Table II shows how 15 separate halftones can be obtained from (2+2) where the ratio of the time slots is 4:1.

TABLE II

Halftones with 2-bit + 2-bit, More Sophisticated Processing (blacklevel = 1; ratio of times 4:1)

| Subpixel | Time | Total |
|---|---|---|
| 0 (both fields) | 0 (both fields) | 1 |
| 0 (1st field) | 1 | 5 |
| 1 (2nd field) | 4 | |
| 0 (1st field) | 1 | 11 |
| 2.5 (2nd field) | 4 | |
| 0 (1st field) | 1 | 15 |
| 3.5 (2nd field) | 4 | |
| 1 (1st field) | 1 | 2 |
| 0 (2nd field) | 4 | |
| 1 (1st field) | 1 | 6 |
| 1 (1st field) | 4 | |
| (1 1st field) | 1 | 12 |
| 2.5 (2nd field) | 4 | |

TABLE II-continued

Halftones with 2-bit + 2-bit, More Sophisticated Processing (blacklevel = 1; ratio of times 4:1)

| Subpixel | Time | Total |
|---|---|---|
| 1 (1st field) | 1 | 16 |
| 3.5. (2nd field) | 4 | |
| 2.5 (first field) | 1 | 3.5 |
| 0 (2nd field) | 4 | |
| 2.5 (1st field) | 1 | 7.5 |
| 1 (2nd field) | 4 | |
| 2.5 (1st field) | 1 | 13.5 |
| 2.5 (2nd field) | 4 | |
| 2.5 (1st field) | 1 | 17.5 |
| 3.5 (2nd field) | 4 | |

The next stage is to use more bits in either the spatial or time division or both. If combinations are used, there would be 31 grey levels; this is more than could be justified on the basis of what the eye can just see except in the case of some particular non-random images such as lines, gratings, regular geometrical shapes etc.

Normally an overall gamma of 2 is desirable because the transmitted video is usually compressed. It has been shown that an adequate television picture can be produced with a 4-bit signal reproduced on a CRT with a gamma of about 2 providing contouring is eliminated by 'error diffusion'. The SSFLCD can be made to have a gamma of 2 if an m-bit divided subpixel is simultaneously addressed by a m-bit BAG or pulsed backlighting scheme so that the same bit in the video byte is used for both.

There will now be described various schemes for addressing, namely:

(a) Monochrome: no BAG: Greyscale by Divided Pixel: If the pixel is divided by a binary sequence into d divisions, there will be about $2^d$ halftones, and the time available for writing a line is unchanged, but the number of column conductors is increased by a factor d.

(b) Monochrome: BAG: Undivided Pixel: If time division multiplexing is used, g grey levels are obtained by writing each line with g different time slots. In the BAG scheme this requires each line to be written n times where $$n = \log(g)/\log(2)$$

(c) Colour Filters: BAG: Pixels Divided: If a greyscale of P levels is achieved by dividing the pixel, and of Q by a BAG scheme, a greyscale of $G = P \times Q$ can be obtained. The time available per line is m times shorter than a simple scan where $$m = \log(g)/\log(2)$$

If colour is added by colour filter dots, (3) becomes $$m(c) = c \log(g)/\log^2$$

where c is constant between 2 and 3.

(d) Writing From Top and Bottom: If the display is written in two halves, these can be addressed (written) simultaneously, and there is twice as long for writing a line as in (a)-(c).

(e) Quad Multiplex: In this scheme, pixels are accessed for their 'line' electrode from the top as well as the sides using a kind of interdigitated structure. This gains a factor 4 in available line time over (a)-(c).

(f) Frame Sequential Backlighting - Full Colour: For an m-bit greyscale by time division, the display needs to be written approximately 2m times and the backlights pulsed on for m times in a binary sequence of integrated light intensity. If the pixels are already subdivided, then, for three colours, it is possible to write the tricolour frame with two full-resolution green fields and one each of half-resolution red and blue with 4 writing pulses. Erase pulses are not necessary between successive writing processes if the entire field is written every time it is changed.

Because the same resolution is not needed in the blue and red compared with green, 575 line 4-bit green+288 line 2-bit blue+288 line 2-bit red give a visually acceptable entertainment TV picture. This means the pixel should be divided and the backlights pulsed on twice per 15 ms for green, and once each for red and blue.

(g) Frame Sequential Backlighting—7 Colours: With pulsed backlighting and no halftones, only 7 colours are available (as in teletext). This will allow more time per line for writing.

Table III shows details of the various options.

TABLE III

Details of Three TV Panels
All three panels are based on a television display running at a frame rate of 65 Hz, and with an aspect ratio of 16:9. There are 575 active lines and no interlace.

| Subpixel | Halftones | | | Time/line |
|---|---|---|---|---|
| | R | G | B | |
| 1. Pulsed backlight divided pixel, quad multiplex, Resolution G = 575 × 1022 R = 288 × 511 B = 288 × 511 (allowing 1 ms for the lamps) | 9(15) | 3 | 3 | 32 μs |
| 2. Colour dot divided pixel according to the colour filter pattern BAG (4,4,4) quad multiplex Resolution G = 575 × 1022 R = 288 × 511 B = 288 × 511 described under (c) and (e) | 15 | 15 | 15 | 16 μs |
| 3. Colour dot, Divided pixel, Pixel further divided according to the colour filter pattern 2-bit BAG quad multiplex Resolution G = 575 × 1022 R = 575 × 511 B = 575 × 511 | 9(15) | 9(15) | 9(15) | 52 μs |

Please note that the figures in brackets in table III refer to the halftones available by the more sophisticated signal processing of the kind shown in Table II. The eye may not be able to discriminate as many halftones as this, and it is not necessarily an advantage to go to these lengths. However, suitable logic circuits might be employed to retain only those combinations which would be useful, and particularly near black, additional levels could be added by alternating randomly between two of the quantized levels.

By using time-division and divided-pixel systems simultaneously, the following advantages are achieved: the spacing between the available halftone levels with simple signal processing (Table I) is more uniform; the restrictions on the available photolithography, space available for conducting lines and speed of switching the liquid crystal or backlight can all be taken into account so that just one of these does not alone limit the available number of halftones; a 2-bit BAG scheme and a pixel structure divided into two, should be adequate for many SSFLC flat panels for entertainment television; a large number of halftones could be employed with the same panel construction by using more sophisticated drive electronics, or alternatively, very similar drive electronics could be used with a more sophisticated panel to do the same thing; as shown, a very similar scheme can be used in a frame sequential system using pulsed coloured backlighting; the method is expandable for time or space elements which are not strictly in a binary sequence, examples being given where the dynamic range was widened by using pseudo-binary sequences of 1:2.5:3.5 and 1 4:5, the gamma of the display can be made 2 by using the same bit in the video byte for both time and spatial division.

Figure 12:
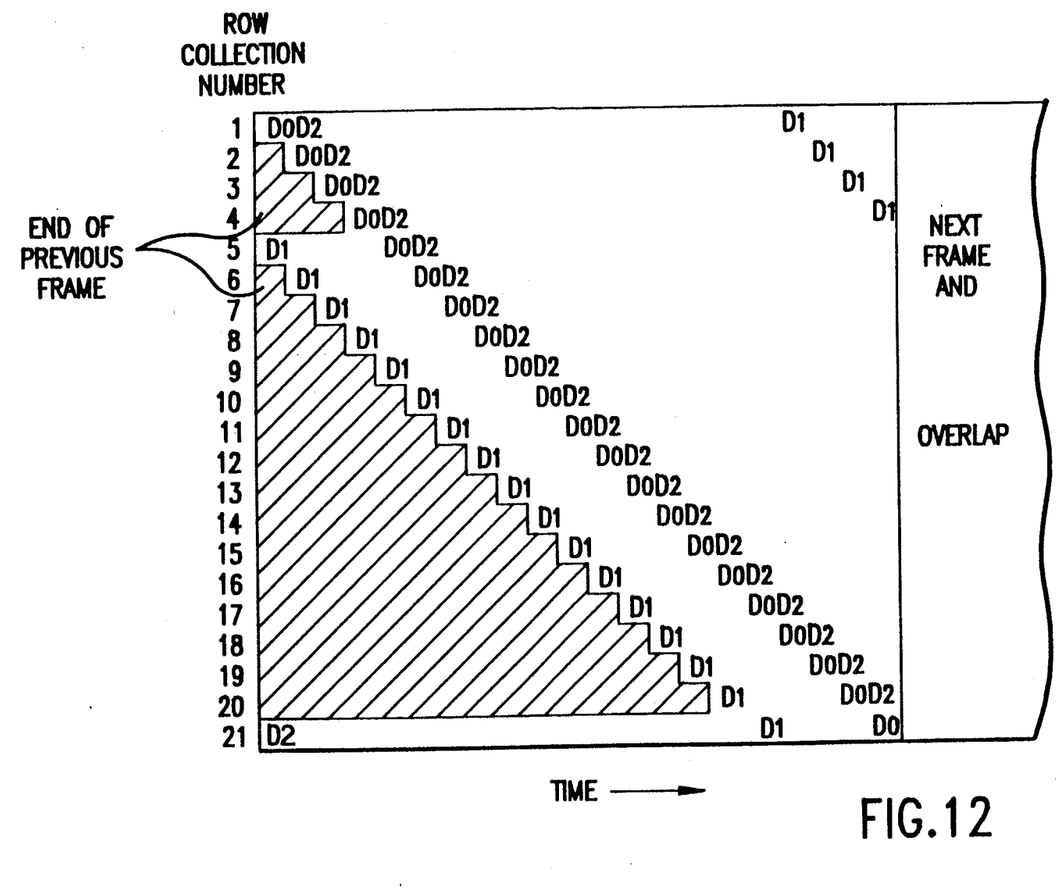
FIG. 12 shows schematically part of another form of display embodying the present invention.

The example illustrated by FIG. 12 concerns a technique for implementing greyscale on a display with a set of discrete brightness states, such as a ferroelectric liquid crystal display employing spatial dither.

For a display with pixels each having N brightness states the number of perceived brightness states is increased by using time dither, that is to say that the pixels can be moved from one state to another in a pattern such that intermediate brightness levels are perceived. A convenient way of doing this is by using a set of M time periods whose lengths differ by a factor of N. The pixel can then be set at a different brightness level during each time period giving $N^M$ available brightness levels. Thus, the technique operates in a number base which is set by the number of states that a given pixel on the display can be in. Matrix addressed displays are written line by line and this has to be taken account of when allocating the weighted time periods.

FIG. 12 shows the main features of a three digit base N scheme. Each pixel is overwritten after the appropriate length of time as a logical consequence of the order in which the lines are scanned. The number of lines in the display is arranged to be a multiple of $$\frac{(N^M - 1)}{(N - 1)}$$

where N is the number of brightness states of each pixel and M is the number of weighted time intervals employed in the scheme.

The required brightness at each pixel on the display is first converted to base N. The digits in this representation are referred to in the diagram as $D_0$, $D_1$ and $D_2$. During the first group address interval the first group of collections of lines is written to. Row collection numbers $$\frac{(N^k - 1)}{(N - 1)}$$

are members of this group for $k \in \{1, \ldots M\}$

Each pixel in each of these collections of rows has the kth digit of the base N representation of its brightness written on it. Thus pixels in the first collection of rows have their least significant digits written to them and pixels is row collection N+1 have their secondmost significant digit written to them, and so on. In the following group address intervals successive groups are written to in a similar fashion. Successive groups are obtained by adding 1 modulo j+1 to the collection number of each member of the previous group, where j is the total number of collection of rows.

In order in which the row collections within a group are written are chosen to minimise the errors introduced by the fact that they are not all written to at once. The smallest errors are encountered when the least significant bit is written first, followed by the nextmost significant, and so on. The total error decreases as N increases. The rows within each collection of rows can be written to in any sequence as long as this sequence is maintained each time they are written to.

In an example of the use of such a scheme, a ferroelectric liquid crystal display employs two bits of spatial dither, so that each pixel can be in one of four states. A four digit quaternary addressed group scheme can be used to obtain 256 grey levels in total. This can be compared with a four bit binary addressed group scheme which gives 16 grey levels.

FIG. 12 shows schematically the matrix-addressing of a scheme involving base-four group time multiplexing with pixel brightness being $D_2$, $D_1$, $D_0$ (3-bit time dither), each pixel having two selectively-settable areas giving four states (2-bit spatial dither). The display is divided as shown, into 21 collections of rows as shown.

In the first group-address period, the first collection of rows has the least-significant bit written to it (this involves writing the two bits of spatial dither, these bits representing 4 levels). Similarly collection 5 has its secondmost significant bit written to it, and collection 21 has its most-significant bit written up.

Now, in the second group-address period, the addressed collections have moved one collection of rows down the display. Thus for example, collection 2 now has its least-significant bit written to it, collection 6 now has its secondmost-significant bit written and now collection 1 has its most-significant bit addressed.

Note that collection 1 has now had its least-significant bit over-written, so that least-significant bit was on display for one group-address period only. Similarly row 5 has its secondmost-significant bit on display for four group-address periods and collection 21 has its most-significant bit on display for sixteen collection group address periods. This means that data written to collections of rows is displayed for a period of time corresponding to the significance of the bit displayed.

When a collection of rows is addressed, four levels must be set for the base 4 scheme. This is done by employing two bits of spatial dither with the areas of the two areas scaled in the ratio 2:1, these two areas must be addressed in parallel.

It can be seen from the diagram that a full 64 level grey-scale picture can be built up in 21 group-address periods.

Thus scheme differs from the existing group time multiplex technique in that the addressing sequence now follows a base 4 period i.e. 1:4:16, and so on, instead of 1:2:4 for the existing technique. This results in a different interval of time between readdressing of a particular collection of rows. An existing group time-multiplex scheme with three bits of time dither allows 8 grey-levels to be displayed whereas a scheme embodying the present invention with two bits of spatial dither and 3 bits of time dither allows 64 grey-levels to be displayed.

We claim:

1. A display device for displaying a picture with grey-scale, the display device comprising:
   a lattice of pixel elements, each selectably settable in dependence on the respective pixel-data in a received signal representing one picture for display;
   means to effect time-multiplex addressing of collections of rows of pixel elements within a group address period according to a predetermined sequence, each collection being addressed a plurality of address times for each picture;
   the addressing means including means to set in each group address period a group of collections of rows said group consisting of a plurality of collections of rows spaced apart in the address sequence such that the collections of rows in a group form a series with adjacent collections of rows having a temporal separation exhibiting a geometric progression in the addressing sequence, the geometric progression having a common ratio N which is an integer of at least 2;
   each pixel within a group being set for a time duration dependent upon the temporal separation of adjacent collections of rows within the sequence thereby to effect a grey-scale display.

2. A display for displaying a picture with grey-scale, the display device comprising:
   a lattice of pixel elements, each selectably settable in dependence on the respective pixel-data in a received signal representing one picture for display;
   means to effect time-multiplex addressing of collections of rows of pixel elements within a group address period according to a predetermined sequence, each collection being addressed a plurality of address times for each picture;
   the addressing means including means to set in each group address period a group of collections of rows, said group consisting of a plurality of collections of rows spaced apart in the address sequence such that the collections of rows in a group form a series with adjacent collections of rows having a temporal separation exhibiting a geometric progression in the addressing sequence, the geometric progression having a common ratio N which is an integer of at least 3;
   each pixel within a group being set for a time duration dependent upon the temporal separation of adjacent collections of rows within the sequence, thereby to effect a grey-scale display.

3. A display device according to claim 1, wherein each pixel element has a number of selectively settable states and N equals said number of states in the pixel.

4. A display device according to claim 1, wherein a signal for a picture includes a plurality of portions each representing data for setting a respective pixel element in the lattice, each such portion being constituted by a plurality of bits with at least one bit representing addressing-data for said respective pixel element in respect of one address time in that picture.

5. A display device according to claim 4 wherein the addressing means includes: means to set all the pixels in any one collection of rows of said group in accordance with a said at least one bit for each pixel in said any one collections of rows in one picture.

6. A display device according to claim 1, wherein the lattice comprises a predetermined number of rows of pixels, and the number of rows in a collection of rows is the number of rows in the lattice divided by $(N^m - 1)/(N - 1)$ where N is said common ratio of geometric progression and M is the number of said address times in a picture.

7. A display device according to claim 1, for displaying a plurality of consecutive picture, the display device comprising means to produce a value for a mean brightness level for a first picture, means to produce a scaling signal by comparing the mean brightness level value with a reference brightness value and means to effect scaling of the brightness level represented by pixel-data for each group in the next picture in accordance with said sealing signal.

8. A display device according to claim 1, where a plurality of liquid crystal cells form the lattice.

9. A method of displaying a picture with grey-scale in a display device, the display device having a lattice of pixel elements each selectably settable, the method comprising:

receiving a signal including pixel-data and representing a plurality of pictures for display;

time-multiplex addressing collections of rows of pixel elements within a group address period according to a predetermined sequence a plurality of address time for each picture;

the addressing step including setting in each group address period a group of collections of rows, said group consisting of a plurality of collections of rows spaced apart in the address sequence such that collections of rows in said group form a series with adjacent collections of rows having a temporal separation exhibiting a geometric progression having a ration N which is an integer of at least 2;

each pixel within a group being set for a time duration dependent upon the temporal separation of adjacent collections of rows within the sequence, thereby to effect a grey-scale display.

10. A method according to claim 9, wherein a signal for a picture includes a plurality of portions each representing data for setting a respective pixel element in the lattice, each such portion being constituted by a plurality of bits with at least one bit representing addressing data for said respective pixel element in respect of one address time in that picture.

11. A method according to claim 10, wherein the addressing step includes: setting all the pixels of a first collection of rows of a group in accordance with a first said at least one bit for each pixel in said first collection in one picture;

then setting all the pixels of another collection of rows of the group in accordance with another said at least one bit for each pixel in said another collection of rows in that picture:

and repeating the setting steps for respective all the pixels of each other collection of rows of the group in accordance with respective said at least one bit for each pixel of said each other collection or rows.

12. A method according to claim 9, wherein N corresponds to the number of states in the pixel.

13. A method according to claim 9, wherein the number of rows of pixels in a collection of rows is the number of rows in he lattice divided by $(N^m - 1)/(N - 1)$ wherein N is said common ration of said geometric progression and M is the number of said address times in a picture.

14. A method according to claim 9 for displaying a plurality of consecutive pictures, comprising the further steps of producing a value for the mean brightness level for a picture, producing a scaling signal by comparing said mean brightness level value with a reference brightness value and effecting scaling of the brightness level represented by pixel-data for each group in the next picture in accordance with said scaling signal.

15. A method of displaying a picture with grey-scale in a display device, the device having a lattice of pixel elements each selectably settable, the method comprising:

receiving a signal including pixel-data and representing a plurality of pictures for display;

time-multiplex addressing collections of rows of pixel element s within a group address period a plurality of address times for each picture;

the addressing step including setting in each group address period a group of collections of rows, said group consisting of a plurality of collections of rows spaced apart in the addressing sequence such that collections of rows in said group form a series with adjacent collections of rows having a temporal separation exhibiting a geometric progression in the addressing sequence, the geometric progression having a common ratio N which is an integer of at least 3;

each pixel within a group being set for a time duration dependent upon the temporal separation of adjacent collections of rows within the sequence, thereby to effect a grey-scale display.

16. A display device for displaying a picture with grey-scale, the display device comprising:

a lattice of pixel elements, each selectably settable in dependence on the respective pixel-data in a received signal representing one picture for display;

means to effect time-multiplex addressing of collections of rows of pixel elements within a group address period according to a predetermined sequence, each collection of rows being addressed a plurality of address times for each picture;

the addressing means including means to set in each group address period a group of collections of rows, said group consisting of a plurality of collections of rows spaced apart in the addressing sequence such that the collections of rows in a group form a series with adjacent collections of rows having a temporal separation exhibiting a binary progression in the addressing sequence:

each pixel within a group being set for a time duration dependent upon the temporal separation of adjacent collections of rows within the sequence, thereby to effect a grey-scale display.

17. A display device according to claim 16, wherein a signal for a picture includes a plurality of portions each representing data for setting a respective pixel element in the lattice, each such portion comprising a plurality of bits with at least one bit representing addressing data for said respective pixel element in respect of one address time in that picture.

18. A display device according to claim 17, wherein the addressing means includes: means to set all the pixels in any one collection of rows of said group in accordance with said at least one bit for each pixel in said any one collection of rows in one picture.

19. A display device according to claim 16, wherein each said group of collections of rows is formed of four collections of rows each of which, during one setting operation, is set in accordance with a respective section of pixel data, said respective section comprising at least one bit for each pixel in a respective collection of rows.

20. A display device according to claim 16, for displaying a plurality of consecutive pictures, the display device comprising means to produce a value for a mean brightness level for a first picture, means to produce a scaling signal by comparing the mean brightness level value with a reference brightness value and means to effect scaling of the brightness level represented by pixel-data for each group in the next picture in accordance with said scaling signal.

21. A display device according to claim 16, wherein a plurality of liquid crystal cells form the lattice.

22. A method of displaying a picture with grey-scale in a display device, the display device having a lattice of pixel elements, each selectably settable, the method comprising:

receiving a signal including pixel-data and representing a plurality of pictures for display;

time-multiplex addressing collections of rows of pixel elements within a group address period a plurality of address times for each picture;

the addressing step including setting in each group address period a group of collections of rows, said group consisting of a plurality of collections of rows spaced apart in the addressing sequence such that collections of rows in said group form a series with adjacent collections of rows having a temporal separation exhibiting a binary progression;

each pixel within a group being set for a time duration dependent upon the temporal separation of adjacent collections of rows within the sequence, thereby to effect a grey-scale display.

23. A method according to claim 21, wherein each group of collections of rows is formed of four collections of rows each of which, during one setting operation, is set in accordance with a respective section of pixel-data, said respective section comprising at least one bit for each pixel in a respective collection of rows.

24. A method according to claim 21 for displaying a plurality of consecutive pictures, comprising the further steps of producing a value for a mean brightness level for a first picture, producing a scaling signal by comparing the mean brightness level value with a reference brightness level value and effecting scaling of the brightness level represented by pixel-data for each group in the next picture in accordance with said scaling signal.

25. A method according to claim 22, wherein a signal for a picture includes a plurality of portions each representing data for setting a respective pixel element in the lattice, each such portion comprising a plurality of bits with at least one bit representing addressing data for said respective pixel element in respect of one address time in that picture.

26. A method according to claim 25, wherein the addressing step includes: setting all the pixels of a first collection of rows of a group in accordance with a first said at least one bit for each pixel in said first collection of rows in one picture; then setting all the pixels of another collection of rows of the group in accordance with another said at least one bit for each pixel in said another collection of rows in that picture; and repeating the setting steps for respective all the pixels of each other collection of rows of the group in accordance with respective said at least one bit for each pixel of said each other collection of rows.

* * * * *